United States Patent [19]

Raimondi et al.

[11] Patent Number: 5,591,115

[45] Date of Patent: Jan. 7, 1997

[54] BARRIER FOR BLOCKING MOVEMENT OF CONTAMINANTS WITHIN AN AGGREGATE PARTICULATE SUBSTRATE

[75] Inventors: Pietro Raimondi, Verona; Willard P. Acheson, Oakmont, both of Pa.; William K. Overbey, Jr., Morgantown, W. Va.

[73] Assignees: K & M Engineering & Consulting Corp., Washington, D.C.; BDM Federal, Inc., Morgantown, W. Va.

[21] Appl. No.: 180,916

[22] Filed: Jan. 12, 1994

[51] Int. Cl.[6] ............................................. A62D 3/00
[52] U.S. Cl. ........................... 588/249; 405/128; 405/131
[58] Field of Search ................................ 405/128, 129, 405/52, 131; 588/249, 250

[56] References Cited

U.S. PATENT DOCUMENTS

| | | | |
|---|---|---|---|
| 4,745,850 | 5/1988 | Bastian et al. | 405/128 |
| 4,846,604 | 7/1989 | Holtmann | 405/128 |
| 5,017,289 | 5/1991 | Ely et al. | 405/128 X |
| 5,067,852 | 11/1991 | Plunkett | 405/128 |
| 5,120,160 | 6/1992 | Schwengel | 405/128 |
| 5,161,914 | 11/1992 | Rahn et al. | 405/128 |
| 5,169,263 | 12/1992 | Johnson et al. | 405/128 |
| 5,249,888 | 10/1993 | Braithwaite et al. | 405/128 |
| 5,252,226 | 10/1993 | Justice | 405/128 X |
| 5,340,236 | 8/1994 | Ikenberry | 405/128 |
| 5,370,478 | 12/1994 | Bartlett et al. | 405/128 |

*Primary Examiner*—Dennis L. Taylor
*Attorney, Agent, or Firm*—Pillsbury Madison & Sutro LLP

[57] ABSTRACT

A system and method of preventing groundwater contamination by a plume of liquid born toxic contaminants that includes establishing a dry barrier between a plume of liquid contaminants and the water table to immobilize the toxic contaminants. The dry barrier is formed by transporting dry gas into the barrier region, such as with injector wells, and then removing it and any moisture it has absorbed, such as with extraction wells to create a layer or bowl shaped structure that is so dry that liquid borne contaminants cannot pass therethrough. By maintaining the barrier, the contaminants form an immobile crust above the barrier which assists in prevention of liquid transport of contaminants into the groundwater. The system is particularly effective when radioactive contaminants are involved because the contaminants can remain fixed and undisturbed underground.

20 Claims, 3 Drawing Sheets

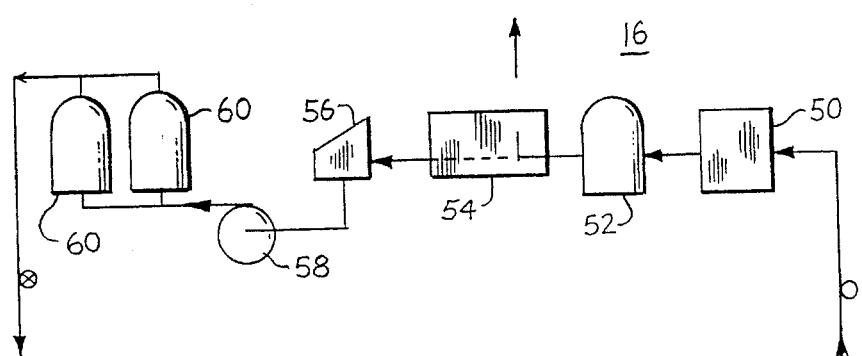
FIG. 4
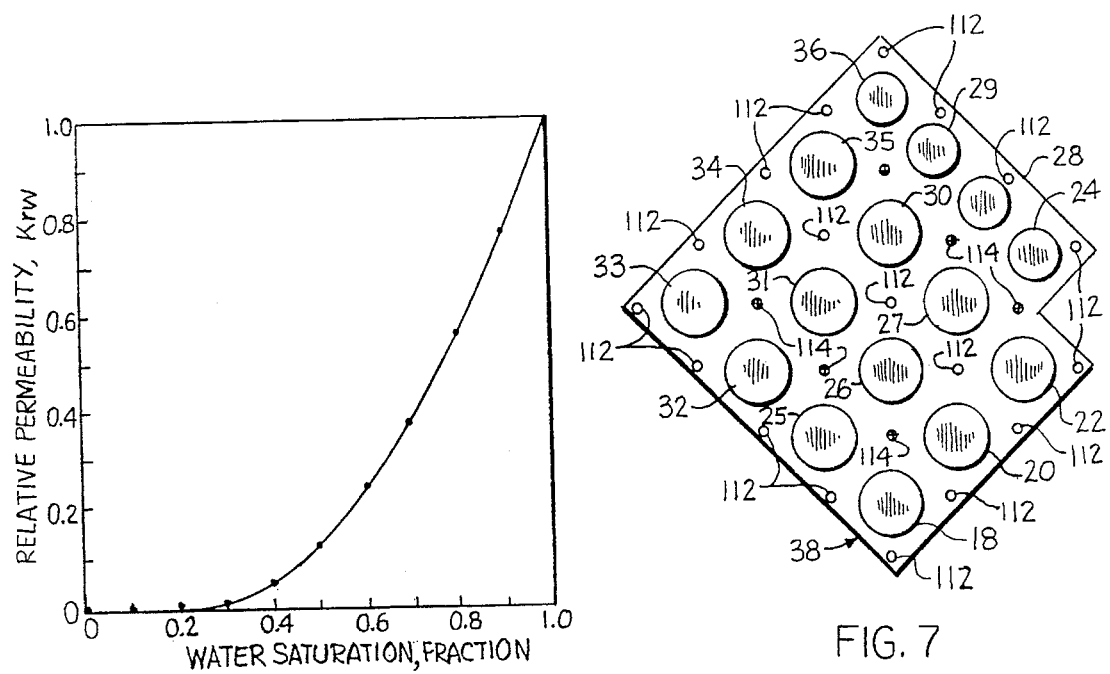
FIG. 5
FIG. 7
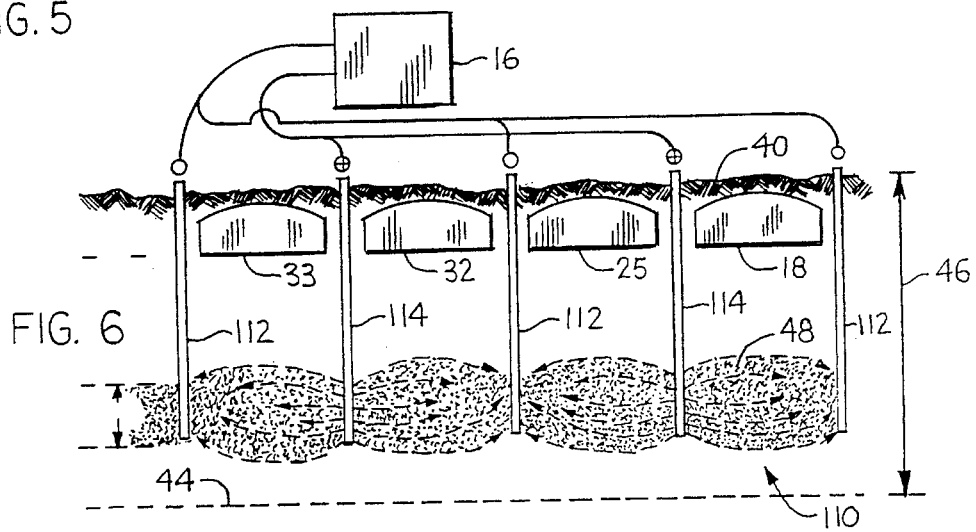
FIG. 6

BARRIER FOR BLOCKING MOVEMENT OF CONTAMINANTS WITHIN AN AGGREGATE PARTICULATE SUBSTRATE

BACKGROUND OF THE INVENTION

The present invention relates generally to the field of hazardous waste containment facilities and more particularly to a system for forming a barrier to the liquid transport of hazardous waste contaminants within an aggregate particulate substrate.

The environment is plagued by the specter of hazardous waste plumes migrating through subsurface regions of the earth toward the underground water supplies. These plumes of hazardous waste are generated by a variety of sources including spills from trains or trucks, and waste storage facilities which have rusted through and are leaking a myriad of noxious substances into the soil.

Remediation measures are designed to minimize any harm which may be caused by these toxic wastes advancing through the earth toward the ground water level and remove the offending matter, if possible. The types of waste include radioactive wastes, carcinogens, organic solvents and heavy metals to name a few. The action taken to prevent catastrophic contamination of the environment varies according to the corresponding cleanup requirements for the contaminants.

One type of system extracts volatile wastes by placing vertical wells into the middle of the toxic waste plume and extracting any volatile gasses or liquids which are at the level of the well. An example of a system for the removal of volatile liquid contaminant is described in U.S. Pat. No. 4,660,639 to Visser, et al. ("Visser").

In Visser contaminants in the vadose zone with a low vapor pressure are volatized and then the resultant gases are removed. There is no guarantee that all of the volatile contaminant will be removed since the well operates from within the center of the plume of contaminants. Also, there is no provision for halting the spread of non-volatile liquids or for compensating for increased contaminant flow caused by an emergency, such as the unexpected breach of a waste storage tank.

Systems which pump out some of the contaminants that are in the immediate vicinity of the well do not provide a continuing reliable means for halting the spread of the toxic plume and act more as an after the fact solution. U.S. Pat. No. 4,832,122 to Corey, et al. ("Corey") teaches a system for removal of volatile contaminants from beneath the water table. Corey discusses a system in which a volatilizing substance is injected underneath the toxic waste plume and the resultant vapors or liquids are collected after they have passed up through the waste. The extraction and injection wells are located on either side of a contaminant plume that has crossed into the water table. The injection well of Corey is located within the saturated zone in the water table. The fluid, which is used by Corey, must be specific to removal of the contaminants in the plume and there is no barrier formed to stop the general liquid transport of contaminants.

Neither Corey or Visser are suitable for preventing ground water contamination due to water borne radioactive wastes such as are found at a waste storage site in Hanford, Wash., The site consists of a tank farm with single wall waste storage tanks used to hold radioactive nuclear wastes. These storage tanks have passed their operational life expectancy and many are now leaking radioactive wastes into the ground above the water table which feeds into the Columbia river basin. Because these wastes are physically as well as radioactivity "hot", water is continually added to the tanks which speeds up the plume's migration through the ground.

Systems designed for removal of volatile wastes from the vadose zone or the water table are not suitable to stop the approaching disaster represented by the Hanford site. In order to ensure the safety of the environment the plume must be stopped, i.e., a reliable barrier to further liquid transport of the radioactive waste must be installed.

At some sites another general technique is used in which an extensive grout barrier is constructed underneath the hazardous waste to prevent further spread of the plume toward the water table. Systems, such as the grout barrier, involve movement of a large amount of material at great expense, as well as, complex construction techniques. Further, the installation of these systems may require personnel down in a caisson to monitor construction.

The physical barriers, such as the grout barriers, serve as a preventive solution to block further contamination but have the disadvantage of being costly, difficult to build, sometimes dangerous for the workers and requiring the removal of large amounts of material during excavation. Further, in case of seismic events, such as earthquakes, the grout barrier can crack and break resulting in leakage of the contaminants through the grout barrier.

There have been no effective preventative measures which are low cost and take advantage of existing construction techniques and even existing facilities to provide a reliable line of defense to advancing contamination rather than try to undo regions which have already been contaminated.

SUMMARY OF THE INVENTION

The present invention creates a barrier to the liquid transport of contaminants through a substrate by circulating a drying carrier through the substrate. Preferably the drying carrier will be dry air and the resultant barrier is referred to as a circulating air barrier. In the circulating air barrier method, dry air is injected from an array of either vertical or horizontal wells. The air sweeps through the porous substrate to production wells, vaporizing water and any volatile organic compounds in the process.

An initial application for the invention is contemplated at a site in Hanford, Wash. Thus, enabling discussions may reference specifics to this site but the invention is not limited in its application to any particular site. It has been calculated that with readily achievable injection flow rates, half of the water currently present could be swept out in one or two years.

The interval targeted for drying is a volume below the waste storage tank farm about 500 by 500 square feet and about 50 feet thick. It starts just under any pre-existing plume, about 150 feet below the surface, and down to about 200 feet, which is about 50 feet above the water table at the Hanford site.

Existing vertical wells may be used, deepened and/or new wells drilled using cable tool, sonic, or dual wall percussion methods. Wells would be drilled or deepened to a depth of 200 feet. The positioning of the vertical wells can be extremely accurate. Each well would be equipped with port collars that can be mechanically opened or closed. Each well could therefore be used to either inject air or produce vapor. Moreover, the injection and/or production could be varied by the depth needed to improve process efficiency.

Horizontal wells are more efficient injectors or producers than vertical wells. Fewer horizontal wells would be required than that required for vertical well operations. Each horizontal well would be equipped with mechanical port collars to provide a large number of injection and production points and thereby improve production from the fifty foot interval that is the target for the conceptual design. Positioning of the horizontal wells is not as accurate as that of the vertical wells. However, extreme accuracy is not required since air provides a wide sweeping pattern. In this regard, a typically higher horizontal than vertical permeability facilitates the confinement of the air flow in the desired 50 foot interval. Therefore, current steering and guidance horizontal well drilling systems are capable of controlling and positioning the borehole at the specified target within an acceptable tolerance range.

The integrity of the barrier can be verified through the produced air itself. Ineffective wells could be detected from geophysical well logs from the production and the injection wells (with the use of packers, even each interval of the horizontal wells can be monitored separately). The productivity/injectivity of these wells can be improved by stimulation or plugging using common oil industry technology. Humidity levels of the produced air will be monitored to indicate how well the zone around a well is being swept or dried. Monitoring of well pressures will provide another means of detecting reservoir problems that need to be corrected. Design of an automatic shutdown in the production system is important to detect and correct process upsets.

The circulating air barrier system will offer the maximum resistance to chemicals thereby providing a chemical reaction free environment. The circulating air barrier system is based on standard oil industry practices used to extract liquids from porous media. No unusual problems are expected by adapting this approach at the Hanford site.

A principal object of the present invention is to provide a a barrier system for blocking the travel of contaminants in an aggregate particulate substrate which overcomes some or all of the disadvantages of the prior art.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention as embodied and broadly described herein, a system for forming a barrier against the liquid transport of contaminants through an aggregate particulate substrate, comprises a drying system for removing moisture from the aggregate particulate substrate; and a barrier region formed by the drying system within the substrate located below the contaminants which is dry and impermeable to liquid transport of the contaminants, the barrier region having a moisture content lower than surrounding substrate.

In another aspect of the invention as embodied and broadly described herein a system for forming a barrier against the liquid transport of contaminants through an aggregate particulate substrate, comprises an injection system for forcing a drying carrier into the substrate below the contaminants; an extraction system for withdrawing the drying carrier after it passes through the substrate; and a barrier region of dry substrate having a saturation value which prevents liquid transport through the barrier region, the substrate in the barrier region being dried by the drying carrier.

In yet another aspect of the invention as embodied and broadly described herein a method for blocking the liquid transport of a contaminant through an aggregate particulate substrate, comprises the steps of installing a barrier region in a zone above the water table by injecting a drying carrier into the aggregate particulate substrate at locations below the contaminant; and withdrawing said carrier from said aggregate particulate at locations below the contaminant spaced apart from the locations at which the drying carrier is injected, the barrier region being installed between the injection locations and the withdrawal locations, the barrier region being desiccated to the extent that no liquid transport of contaminants occurs through the barrier region. The accompanying drawings, which are incorporated in and constitute a part of the specification, illustrate one embodiment of the invention, together with the description, serve to explain the principles of the invention.

BRIEF DESCRIPTION OF THE DRAWINGS

FIG. 4 is a block diagram of the air processing system of the barrier system of the present invention;

FIG. 5 is a graph showing relative permeability versus water saturation for an exemplary particulate aggregate substrate;

FIG. 6 is a cross sectional view through the earth showing another embodiment of the barrier system of the present invention;

FIG. 7 is a top view of a tank farm showing the location of wells for the barrier system of FIG. 6.

DESCRIPTION OF THE PREFERRED EMBODIMENTS OF THE PRESENT INVENTION

Figure 1:
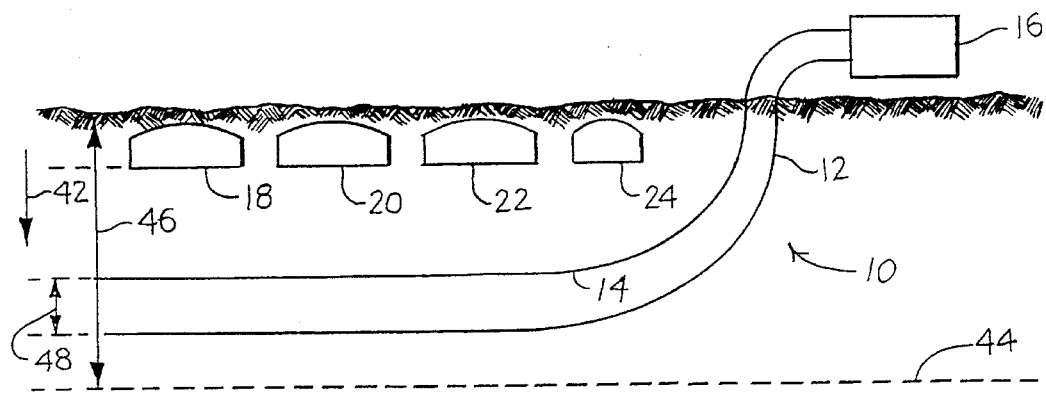
FIG. 1 is a cross sectional view through the earth showing the barrier system of the present invention.

Reference will now be made in detail to the present preferred embodiments of the invention, an example of which is illustrated in the accompanying drawings. In the figures like reference numerals refer to like structures.

A first preferred embodiment of the present invention for a system for forming a barrier against the liquid transport of contaminants through an aggregate particulate substrate is illustrated generally in FIG. 1 and is referred to generally as barrier system 10. FIG. 1 illustrates diagrammatically a cross sectional view of a waste storage site which includes barrier system 10 and waste storage tanks 18, 20, 22, 24. In the first preferred embodiment of the present invention barrier system 10 includes an injection well 12, extraction well 14 and air processing system 16.

Figure 2:
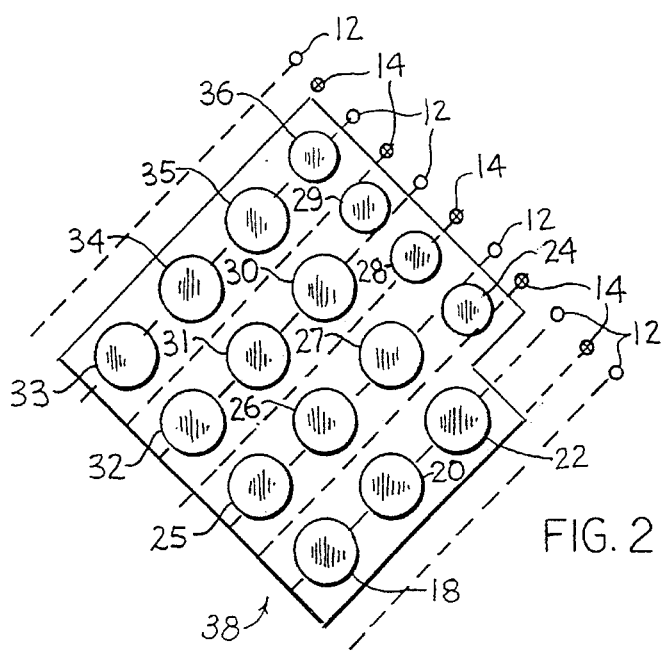
FIG. 2 is a top view of a tank farm showing the location of the wells of the barrier system of FIG. 1.

FIG. 2 shows a top view of a tank farm 38 from a typical type of waste storage facility, i.e., the Hanford site, located in Hanford, Wash. which is the subject of cleanup efforts presently. Waste storage tanks 18, 20, 22, 24, shown in FIG. 1, are four of the total of sixteen waste storage tanks 18, 20, 22, 24, 25–36 located within tank farm 38.

Waste storage tanks 18, 20, 22, 24, 25–36 are all buried under soil surface 40 as shown in FIG. 1 wherein aggregate particulate matter such as soil, sand, gravel or sometimes clay (as is known in the art) extends in the downwardly direction from surface 40 as indicated by arrow 42. The waste storage site can be arranged in any known configuration with waste storage tanks 18, 20, 22, 24 either buried at varying depths or located on the surface. At the Hanford site, these waste storage tanks are a single wall construction and have passed their operational life expectancy and so many tanks are developing leaks. The leakage from individual waste storage tanks includes a variety of radioactive compounds. The present invention is intended to block the liquid transport of the leakage to water table level 44.

Extending downwardly from soil surface 40 to water table level 44 is a region referred to as vadose zone 46. Within vadose zone 46 is located the above described aggregate particulate matter ranging from sand to clay. In a preferred embodiment of the present invention, vadose zone 46 is filled principally with sand or gravel and barrier system 10 is set up within semi arid to arid climate zones such as found at the Hanford site. However, other climates and soil compositions are suitable for application of the principles of the present invention.

Figure 3:
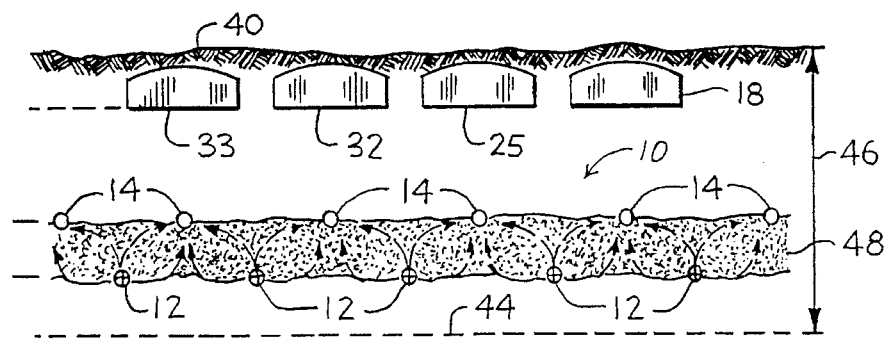
FIG. 3 is a cross sectional view through the earth of the barrier system of FIG. 1.

FIG. 3 is another cross sectional view showing system 10 set up in tank farm 38. In FIG. 3 the cross-sectional view is rotated 90 degrees from FIG. 1 so that waste storage units 33, 32, 25, 18 are shown.

Both injection wells 12 and extraction wells 14 can be created using commercially available drilling technologies. For example, drilling rigs which may be used include an Eastman Christensen type drilling rig; a slimhole drilling system utilizing a coiled tubing drilling unit; various types of cable tool drilling rigs or a sonic drilling rig. Typical issues involved in the drilling of injection wells 12 and extraction wells 14 include drilling boulders and cobbles, borehole stability, directional control in horizontal drilling, mobilization of contaminants, control of drilling effluents, and completion of the borehole.

Given that these wells generally do not require manned downhole supervision the amount of equipment required is reduced and the overall safety is increased. However, if any drilling through hazardous wastes occurs then there must be some means provided for treating the material taken from the borehole. Additional details relating to the drilling technologies are set forth below.

FIG. 3 shows a head on view of a number of extraction wells 14 and injection wells 12. Extraction wells 14 are represented by "⊗" symbol for head on or cross sectional views and injection wells 12 are represented by "○" symbol for head on or cross sectional views as shown in FIGS. 2 and 3.

In this first preferred embodiment a barrier region 48 is positioned underneath waste storage tanks 18, 20, 22, 24, 25–36. Barrier region 48 is shown as extending between extraction wells 14 and injection wells 12. However, as will become clear in the following description, barrier region 48 may extend beyond extraction wells 14 and injection wells 12. Preferably, barrier region 48 is located above the water table level 44 and, if possible, below any plumes of contaminants which may be leaking from any of waste storage tanks 18, 20, 22, 24, 25, 26–36 located in tank farm 38.

In FIG. 3 dashed arrows represent the flow of air from injection wells 12 to extraction wells 14. In accordance with the invention the method for blocking liquid transport of a contaminant through an aggregate, particulate substrate, includes the step of injecting a drying carrier into the aggregate particulate substrate below the contaminant. Preferably, a drying carrier such as desiccated air is introduced through injection wells 12.

Accordingly, in the method for blocking liquid transport of a contaminant through an aggregate, particulate substrate the drying carrier is withdrawn from the aggregate particulate substrate at a location spaced apart from the location at which the carrier is injected. Preferably, during normal operation of barrier region 48, the injected drying carrier, e.g., compressed air, injected at injection wells 12, is extracted at corresponding extraction wells 14, which are sometimes referred to as "production wells".

In a preferred embodiment of the invention, barrier region 48 is installed in vadose zone 46 to prevent the migration of contaminants through vadose zone 46 and into ground water 44. Barrier system 10 removes moisture in the soil in barrier region 48. Water will not flow in a formation through soil which has a saturation value below a critical value. Removal of some or all of the water from barrier region 48 will effectively prevent the liquid transport through barrier region 48.

The barrier system of the present invention creates an extremely dry zone, i.e., barrier zone 48, under the area that the contaminants are being confined which no liquids can penetrate until a critical liquid saturation value is exceeded. After the critical liquid saturation value is exceeded viscous flow, i.e., liquid transport, may be initiated. The critical saturation value is dependent on the physical and chemical characteristics of the aggregate, particulate substrate. For most sandy deposits this critical liquid saturation value is on the order of 5 to 25 percent. At the Hanford waste storage site the critical saturation values are on the order of 20 percent.

The ratio of fluid mobility at a particular saturation value divided by the fluid mobility at 100 percent saturation is a measure of relative permeability. As illustrated in FIG. 5, relatively little liquid transport occurs in fine unconsolidated sand (100–200 mesh) below a water saturation value of 30 percent and liquid transport essentially ceases below 20 percent.

Therefore, barrier region 48, will act as a fixed barrier to liquid transport of any contaminants. All contaminants including volatile organic compounds and water borne salts or suspensions will be prevented from flowing into water table 44.

In the presently preferred embodiment, barrier system 10 is a closed system in which air is circulated by air processing system 16 from injection wells 12 through barrier region 48 and into extraction wells 14 and not allowed to enter the atmosphere untreated. The drying carriers used may include heated air, ambient air, $CO_2$, etc. or a combination of individual components, such as air and $CO_2$. As illustrated in FIG. 4, air processing system 16 includes a monitoring system 50, exhaust treatment system 52, shunt valve 54, intake filters 56, compressors 58, and drying columns 60.

Preferably, air from intake filters 56 is compressed by the compressors 58. Compressed air is then sent through drying columns 60 to be dried and then pumped down injection wells 12. Compression heats the air although additional heat may be added before the air is circulated down the injection wells 12.

The air exits injection wells 12 into barrier region 48 where the air vaporizes water and volatile liquids in the soil. The dashed arrows in FIG. 3 show the general path of air and generated vapor from injection wells 12 into extraction wells 14. Extraction wells 14 pump the air to the surface and into monitoring system 50, which detects the entry of contaminants into barrier region 48. That is, if after barrier region 48 is installed contaminants enter into the barrier region 48 then the air will act as a drying carrier and transport vapor and liquid wastes up to monitoring system 50.

Monitoring system 50 will be set to detect, inter alia, water and radiation. Contaminants which are present can then be removed by exhaust treatment system 52 and then either recirculated into injection wells 12 via intake filters 56 or vented into the atmosphere by shunt valve 54. The flow velocity of the air up into extraction wells 14 is low enough so no particulates are anticipated to be brought up from the extraction wells 14. However, exhaust treatment system 52 includes a high efficiency particulate air filter system (a HEPA filter system) for possible radioactive particulates and a granulated charcoal filter to capture tritium gas.

The use of air as the drying carrier may present a problem in containing the air in the zone of interest at extraction wells 14. Flow of air to the surface is possible since air will flow through the paths of least resistance or high permeability. Further, the air which flows to the surface may carry contaminants with it. The resultant environmental problem can be controlled at surface 40 by providing a clay layer with reduced permeability.

Initially, after wells 12 and 14 are drilled and all components of barrier system 10 are in place then the installation of barrier region 48 begins. That is, before barrier system 10 is activated the soil is at its normal saturation level and may even have some contaminants already present therein. During installation of barrier region 48 the air is passed through the soil so as to remove moisture and form barrier region 48 which will block all liquid transport. The compressed air, i.e., drying carrier, sweeps through barrier region 48 vaporizing water and waste liquids present in barrier region 48.

The speed of the installation process depends principally on the energy which is desirable to spend to dewater the soil. Other known dewatering techniques may be used such as application of an electric current. Barrier region 48 can be installed in as little as a matter of a few months with a relatively large energy expenditure or at a slower rate with a lower energy expenditure. Most of the energy required is for the compression and circulation of air, which in turn depends on the amount of water in the soil and the thickness of barrier region 48.

When finally installed barrier region 48 will block all liquid transport, regardless of the type of contaminant or liquid. It is not necessary to change the drying carrier to suit the contaminant type in the typical case.

The construction and installation of barrier system 10 would not create any movement of waste storage units 18,20,22,24,25–36 or change the stresses around waste storage units 18,20,22,25–36. After installation of barrier region 48, a significant amount of drying has taken place and prolonged periods of non-injection can be tolerated without damage to barrier region 48. Thus, in case of seismic events, such as earthquakes, pipes could break, leading to a temporary shut down during repairs without interruption of the effectiveness of barrier system 10.

Many of the radioactive elements present in the Hanford site exist in dissolved form as salts contained in the liquids. Barrier system 10 evaporates the liquids in the soil, i.e., aggregate particulate substrate, leaving the solids deposited or crystallized in the soil just above or at the upper edge of the barrier sign 48. The build up of deposited solids in the soil will cause a hard crust to form. The resultant crust will serve as an additional barrier to the flow of contaminants in the downward direction 42.

Many types of dissolved salts or water born particulate may be deposited to form a crust at the upper edge of barrier region 48. The radioactive components of the crust will accumulate and increase the temperature of the crust so that the crust will cause volatilization of liquid as the liquid reaches the zone of elevated temperature created by the radioactivity of the crust.

Figure 8:
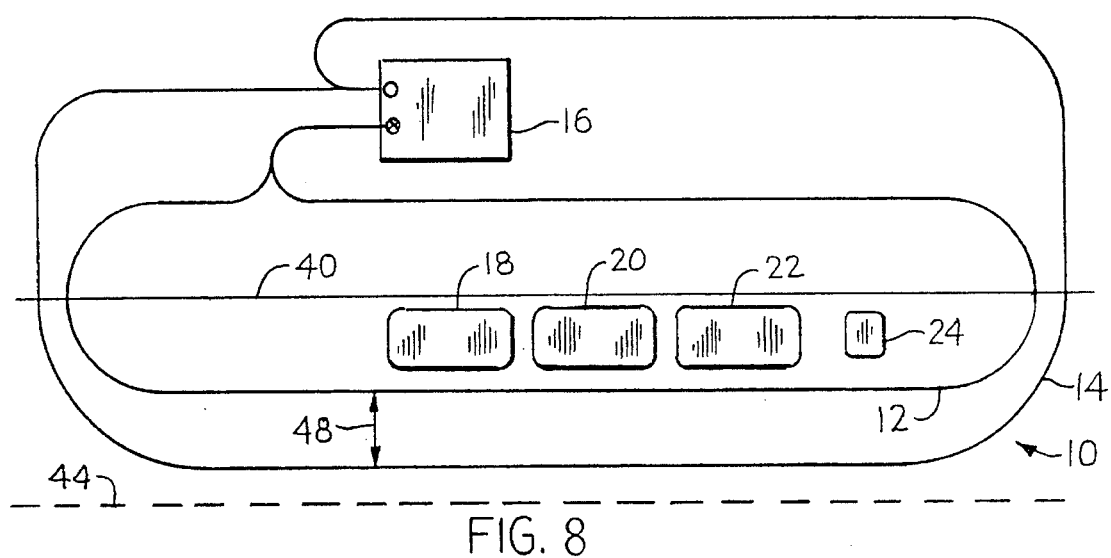
FIG. 8 is a cross sectional view through the earth showing a third embodiment of the barrier system of the present invention.

Additionally, the shape of barrier region 48 may be altered by controlling the path of the boreholes for injection wells 12 and extraction wells 14 so that barrier region 48 can form a bowl shaped region to contain the advancing plume of contaminants. An alternate embodiment of barrier system 10 designed to form a bowl shaped barrier region 48 is illustrated in FIG. 8. Barrier system 10 of FIG. 8 shows injection wells 12 which can have drying carrier inspected at either or both ends, as well as, extraction wells 14 which can have extraction of drying carrier and possible vapor at either or both ends.

The resultant crust and any material contained above the crust may be mined at a later date. When the technology becomes cost effective, the concentrated material located in and above the crust can be removed and stored in a permanent storage facility.

In a second, alternate embodiment, vertical injection wells 112 and vertical extraction wells 114 are used in a barrier system 110, as shown in FIG. 6. Vertical injection wells 112 and vertical extraction wells 114 are used in place of injection wells 12 and extraction wells 14 of the first embodiment illustrated in FIGS. 1–3. Barrier system 110 operates in the same manner as discussed with respect to the operation of barrier system 10 except that the drying carrier, which in the preferred embodiments is air, travels horizontally between vertical injection wells 112 and vertical extraction wells 114 as illustrated by the dashed arrows of FIG. 6.

In the second preferred embodiment, barrier system 110 is a closed system in which air is circulated by air processing system 16 from vertical injection wells 112 through barrier region 48 and into vertical extraction wells 114 and not allowed to enter the atmosphere untreated. FIG. 7 illustrates the placement of vertical injection wells 112 and vertical extraction wells 114 within waste storage tank farm 38.

Existing vertical wells may be used without modification, may be used after deepening, or new wells may be drilled using cable, tool, sonic, or dual wall percussion methods, as discussed above, and in greater detail below. Vertical wells 112 and 114 can be positioned with extreme accuracy. Vertical wells 112 and 114 can also have the depth of extraction or injection varied along the length of the borehole.

However, horizontal wells such as wells 12 and 14 are more efficient at injecting and extracting air. Although horizontal wells cannot be positioned as accurately as vertical wells, given the current positioning systems and the fact that extreme accuracy is not important in the typical case, horizontal wells are preferred since fewer are needed. Also, horizontal wells can be drilled from outside tank farm 38, whereas vertical wells may have to be drilled through the contamination plume which would require the treatment of contaminated soil which is brought up.

The drilling technologies which are currently under consideration for use in implementation of the present invention are discussed below.

Cable Tool Drilling: Cable tool drilling methods are currently utilized at the Hanford site for drilling wells in and around the tank farms. The cable tool wells are usually drilled very straight, and deviate only slightly when encountering cobbles or boulders. Health and safety requirements are relatively easy to control using this drilling process. When drilling in contaminated terrain, samples are checked for radiation while still in the bailer or core barrel. Protocols relating to handling of radioactive samples are implemented if radioactive materials are detected. This methodology produces only very minor, short term environmental impacts relative to cuttings, noise and fugitive dust. In addition, no water is used while drilling in contaminated areas at the Hanford Site. Cable tool drilling is the method choice at Hanford for these reasons.

Slant Wells—Air Rotary Drilled: Many mineral exploration drilling rigs are top drive rigs that are designed to initiate drilling operations at inclinations of up to 70 degrees from vertical. Coring operations can be conducted with these rigs as easily as drilling operations. Air-rotary rigs equipped with large diameter drill pipe and tungsten carbide button bits can drill through most cobbles and boulders, but a downhole motor will likely be required to maintain the drilling angle. Health and safety effects from air drilling operations have been greatly reduced in recent years. Drilling effluents can be handled in a closed system to minimize problems associated with fugitive dust that may be contaminated. Drill cuttings are removed by a cyclone and the air with minor particles can then be passed through a HEPA filter to remove all other particles including any airborne radioactive material. Access at the surface is not a problem because the rig can be located outside of the tank farm.

Slant Wells—Sonic Drilled: Sonic drilling methods were developed in Canada more than 25 years ago for use in the Canada's Athabasca Tar Sands deposits. Sonic drilling is a method of drilling whereby a vertical oscillation is imparted to the drill by two counter rotating eccentric weights mounted in a unit placed on top of the hydraulic pull down rig. The unit also has a rotary bushing that provides a rotary motion in conjunction with the vertical oscillation. This allows a relatively easy penetration of unconsolidated sand and cobble formations, but the drilling of boulders is more difficult. The cuttings remain inside the drill pipe and are removed by bailing or by auguring. Collecting samples at a specific depth is best accomplished by bailing the material inside the drill pipe. Special control units for handling cuttings need to be developed for application at particular tank farms such as some of the tank farms at the Hanford site.

Horizontal Wells Air Drilled: Horizontal wells can be drilled with either mud or air as the circulating medium using either oil field type rigs or with river crossing rigs. These rigs may have problems where cobbles and boulders in unconsolidated sediments are dislodged and roll around under the tri-cone button bit. Methods of immobilizing cobbles and boulders will need to be developed and tested at the site, including cementing the formation in advance of drilling. Horizontal wells can be steered using downhole motors for azimuth and inclination deviation corrections. Directional control must be perfected if parallel horizontal boreholes are to be placed beneath the Hanford tank farms. Health and safety effects can be reduced and environmental control enhanced by using a closed air drilling system to separate the drill cuttings from the air stream for subsequent filtration and contaminant removal. Horizontal wells can be drilled from outside of tank farm 38 to minimize surface access problems. Because the wells can access practically any point under the waste storage tanks, horizontal wells have the highest process efficiency of the various methods under consideration.

Compaction Thrust Boring System (with Caissons): Compaction boring systems use hydraulic rams to thrust a boring device through the soil, compacting the particles into the available pore space. The bits are guiding devices that allow directional control of the drill rods within a limited range. Modifications to the equipment may allow the units to drill to depths of 75 feet. Compaction boring devices are not good at drilling cobbles but probably are more adroit at maneuvering around them if a tortuous drill path is acceptable. This equipment may require some modifications to handle any returned materials in an environmentally safe manner. The equipment must be launched from an area that is at least 15 feet wide to be able to handle the drill pipe, so a twenty foot diameter caisson must be sunk to the target depth to allow launching of the boreholes in the proper orientation.

The barrier system of the present invention may be used in conjunction with other systems such as the typical grout barrier or a cryogenic subsurface barrier such as described in U.S. Pat. No. 4,860,544. That is, barrier system 10 may be set up on the under side of an existing physical barrier to ensure its integrity and monitor the effectiveness of the in place barrier system.

It will be apparent to those skilled in the art that various modifications, variations and additions can be made in the system for creating a barrier to the movement of contaminants within an aggregate particulate substrate of the present invention without departing from the scope or spirit of the invention. Thus, it is intended that the present invention cower the modifications and variations of this invention provided they come within the scope of the appended claims and their equivalents.

We claim:

1. A system for preventing the liquid transport of contaminants dissolved in the liquid through an aggregate particulate substrate in the vadose zone, comprising:

a drying system for removing about at least 75% of the saturation moisture from the aggregate particulate substrate in a generally horizontal drying zone below the contaminants whose liquid transport is to be barred by transporting a drying carrier through the drying zone; and a generally horizontal barrier region of aggregate particulate formed and maintained by said drying system within the drying zone in the aggregate particulate substrate located below the contaminants, which is about less than 25% of saturation moisture so that said barrier region is impermeable to downward liquid transport of the dissolved contaminants therethrough, even if said drying system is temporally inoperative.

2. The system according to claim 1, wherein said drying system includes:

circulation means for causing the drying carrier to be circulated through the drying zone.

3. The system according to claim 2, wherein said circulation means include:

at least one injection well for injecting the drying carrier into the drying zone; and at least one extraction well for extracting the drying carrier from the drying zone.

4. The system according to claim 3, wherein said barrier region has:

an upper edge facing the contaminants whose liquid transport is to be barred; and a crust at said upper edge, said at least one injection well and said at least one extraction well being configured so that when liquid transporting dissolved contaminants approach said barrier region, the transporting liquid is volatilized by the drying carrier and remaining solid contaminants form said crust along said upper edge of said barrier region to enhance said barrier region.

5. The system according to claim 3, wherein said at least one injection well and said at least one extraction well are positioned so that said barrier region is at least laterally co-extensive with contaminants being transported downwardly within the aggregate particulate substrate.

6. The system according to claim 4, wherein said wells are positioned so that said barrier region is formed with a bowl like shape, whereby liquid transport of contaminants downwardly and laterally is prevented.

7. The system according to claim 4 wherein said drying carrier is dry air.

8. The system according to claim 4 wherein said drying carrier is primarily carbon dioxide gas.

9. The system according to claim 1, wherein said drying system includes:
monitoring means that detect moisture content and rate of change of moisture content in the drying carrier for monitoring the integrity of said barrier region.

10. The system according to claim 4 wherein said air of said drying carrier is heated.

11. A system for forming a barrier against the liquid transport of contaminants down through an aggregate particulate substrate, comprising:
a. an injection system for forcing a drying carrier into the substrate below the contaminants; and
b. an extraction system for withdrawing the drying carrier after it passes through a volume of the aggregate particulate substrate to remove at least about 75% of the saturation moisture from the volume of aggregate particulate substrate, said injection and extraction systems thereby forming a layer of dry aggregate particulate substrate having a saturation value of about 25% or below to prevent any appreciable liquid transport of contaminants down through said dry substrate layer to thereby form the barrier.

12. The system according to claim 11, wherein said injection system includes:
at least one injection well, and said extraction system includes:
at least one extraction well.

13. The system according to claim 12, including:
a processing system for drying the drying carrier and delivering the dried drying carrier to said injection system.

14. The system according to claim 13, wherein said processing system recirculates drying carrier from said extraction system.

15. The system according to claim 13, wherein said processing system includes:
monitoring means for monitoring variation in the rates at which moisture is removed by said extraction system to thereby provide an indication of the integrity of the barrier.

16. The system according to claim 15, wherein said monitoring means include:
means for detecting the entry of contaminants into the barrier.

17. A method for blocking the liquid transport of a contaminant down through an aggregate particulate substrate into a water table, comprising the steps of:
installing a dry barrier region whose water fraction saturation is about 25% or below so that the relative permeability of the dry barrier region is essentially zero in a zone above the water table by:
injecting a drying carrier into the aggregate particulate substrate at locations that are generally horizontal to each other below the contaminant in liquid transport; and
withdrawing the drying carrier from the aggregate particulate at locations spaced apart generally horizontally from the locations at which the drying carrier is injected, the dry barrier region being installed in a volume between the injection locations and the withdrawal locations;
maintaining the drying barrier region by:
injecting the drying carrier into the aggregate particulate substrate at locations that are generally horizontal to each other below the contaminant in liquid transport; and
withdrawing the drying carrier from the aggregate particulate at locations spaced apart generally horizontally from the locations at which the drying carrier is injected at a reduced rate.

18. The method according to claim 17, further including the steps of:
monitoring the drying carrier withdrawn from the aggregate particulate substrate for moisture;
determining the possible formation of leaks in the dry barrier region from increases in the moisture content of the drying carrier that is withdrawn; and
increasing the rate of injection and withdrawal of the drying carrier upon determining the possible formation of leaks in the dry barrier region.

19. The method according to claim 17 wherein the step of installing a dry barrier region includes:
installing the dry barrier region across a generally horizontal area larger than a horizontal area encompassed by liquid borne contaminants within the aggregate particulate substrate.

20. The method according to claim 17, wherein the dry barrier region has an upper edge facing the contaminants and a lower edge facing and spaced from the water table, said method further including the step of:
forming a crust of contaminants along the upper edge of the dry barrier region by maintaining the low moisture content of the upper edge.

* * * * *